Nov. 6, 1951         F. A. KANE, JR., ET AL         2,574,109
DEVICE FOR ADJUSTABLY INTERFITTING TWO COACTIVE MEMBERS
Filed Feb. 17, 1949                                 2 SHEETS—SHEET 1
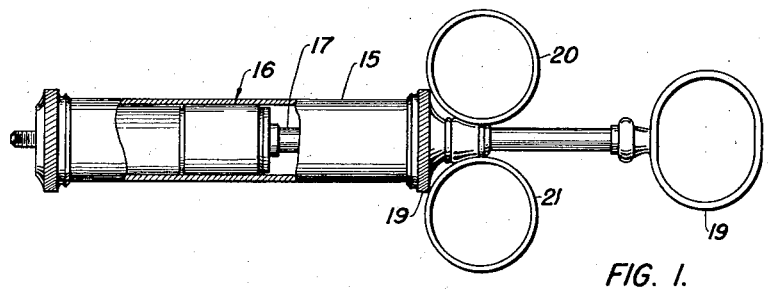
FIG. 1.
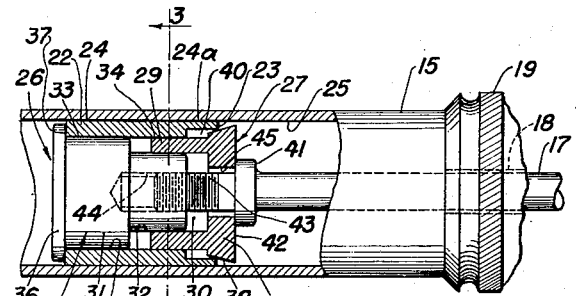
FIG. 2.        FIG. 3.
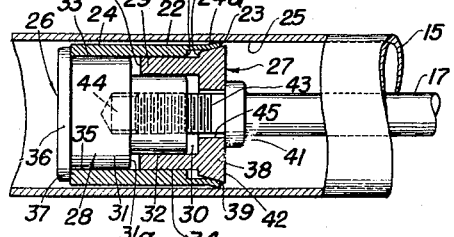
FIG. 4.
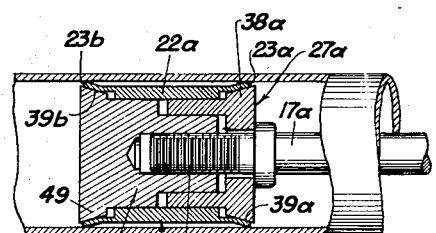
FIG. 7.
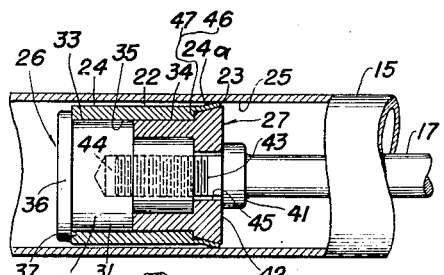
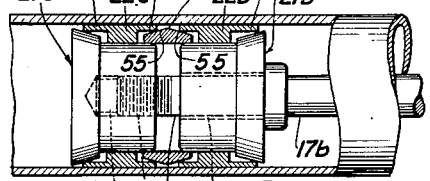
FIG. 5.        FIG. 8.
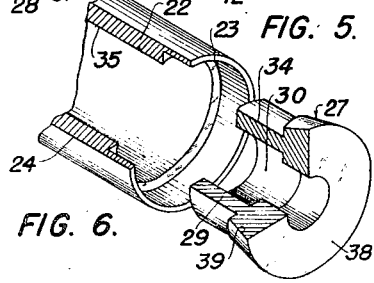
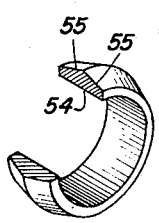
FIG. 6.        FIG. 9.
INVENTORS
FRANK A. KANE, JR.
GIRARD F. OBERRENDER
BY
ATTORNEY Nov. 6, 1951     F. A. KANE, JR., ET AL     2,574,109
DEVICE FOR ADJUSTABLY INTERFITTING TWO COACTIVE MEMBERS
Filed Feb. 17, 1949     2 SHEETS—SHEET 2

INVENTORS
FRANK A. KANE, JR.
GIRARD F. OBERRENDER
ATTORNEY

Patented Nov. 6, 1951

2,574,109

UNITED STATES PATENT OFFICE 2,574,109

DEVICE FOR ADJUSTABLY INTERFITTING TWO COACTIVE MEMBERS

Frank A. Kane, Jr., Stratford, Conn., and Girard F. Oberrender, New York, N. Y.

Application February 17, 1949, Serial No. 76,932

18 Claims. (Cl. 309—36)

This invention relates to a device for adjustably interfitting two coactive members—more particularly to a cylindrical member with an annular spreading portion adapted for adjustable use in pistons, as a holding element in couplings, and for other analogous uses as will more clearly hereinafter appear.

It is primarily within the contemplation of our invention to provide an inner cylindrical spreading or expanding member operated by a preferably manually manipulated forcing member or spreader, so as to vary the diameter of the cylindrical member within predetermined limits whereby it may cooperate with an outer cylindrical member to produce either (1) various degrees of sliding fits or (2) certain types of friction grips.

In the first-mentioned aspect of this invention, the coacting spreading and forcing members are conveniently adapted for use as plungers or pistons; and for illustrative purposes, the drawings and description hereinafter given show its application to a syringe such as is used by physicians for irrigation and hypodermic injection purposes.

In the second aspect of our invention, the said coacting members are conveniently adapted for use in various types of coupling devices wherein the spreading or expanding action of the device serves to hold the two complementary assembly elements in releasable but firm frictional engagement. For the purposes of this specification, the coupling embodiment of the invention is shown as applied to garden hoses and analogous conduit devices.

In using conventional syringes, physicians generally find it necessary to replace worn-out plungers; and such replacements generally entail considerable cost, since each syringe must have its own specially fitted plunger, interchangeability of plungers not being practicable because of the need for hand fitting. Furthermore, where a physician employs a number of syringes, it is necessary to observe considerable caution in removing the plungers for sterilization, etc., and reassembling them; and it has been found that considerable time is lost in matching disassembled plungers with their corresponding cylinders.

It is an important object of our invention to eliminate the above-mentioned shortcomings of conventional syringes, by providing a readily adjustable plunger, so that the plunger element can be adjustably expanded after wear to suit the needs and individual technique of the physician, by a simple manual manipulation. And it is also an object to employ the same adjusting mechanism for use in other types of reciprocating piston structures.

It is also an object of this invention to prevent operative wear of the spreading member beyond a predetermined point, and to provide means for enabling the user of the device readily to ascertain when such point has been reached.

A further object of this invention is to provide a simple mechanism capable of performing the aforesaid functions, and adapted for ready fabrication and simple assembly, and capable of permitting the ready replacement of worn-out spreading parts with new parts.

With respect to the coupling embodiment of our invention, it is an important object to provide means for effecting a coupling and uncoupling action by a simple manual manipulation, thereby obviating the necessity of revolving one of the coupling elements through a number of revolutions as occurs where threaded couplings are employed.

And still another object of the last-mentioned embodiment of the invention is to provide both secure locking means as well as a leak-proof design, whereby the device is particularly adaptable for use with water pipes.

Other objects, features and advantages will appear in the drawings and description hereinafter given.

Referring to the drawings,

Figure 1 is a front elevation, with a fragment removed, of a physician's syringe showing one form of my invention.

Figure 2 is an enlarged fragmentary elevation of Fig. 1, showing the relative positions of the spreading and forcing members before there has been any appreciable wear.

Figure 3 is an end view of Fig. 2.

Figure 4 is a view substantially like Fig. 2, but showing the spreading member in a somewhat expanded condition, after some wear.

Figure 5 is a view substantially like Fig. 4, showing the spreading member in a further expanded condition due to further wear, the deflection being exaggerated for clarity.

Figure 6 is an exploded perspective view of fragments of the spreading member and the forcing member.

Figure 7 is an enlarged fragmentary view, partially in section, of a modified form of my invention, showing the spreading member with two oppositely disposed annular expanding portions.

Figure 8 is a view like Fig. 7 of another modification showing two spreading members actuated by forcing members, this form being adapted for use where relatively long pistons are required.

Figure 9 is a perspective view of the floating ring of Fig. 8.

Figure 12:
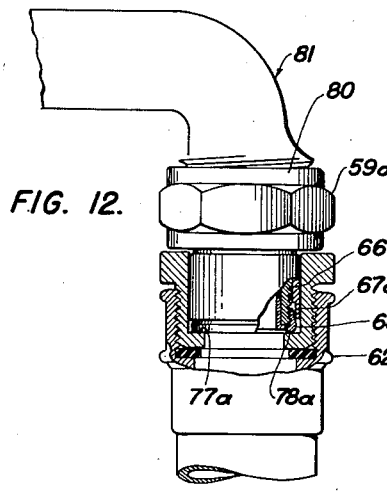
Figure 12 is a part elevational, part sectional view of a modified coupling form of my invention shown applied to a faucet terminal with a hose connected thereto.
Figure 13:
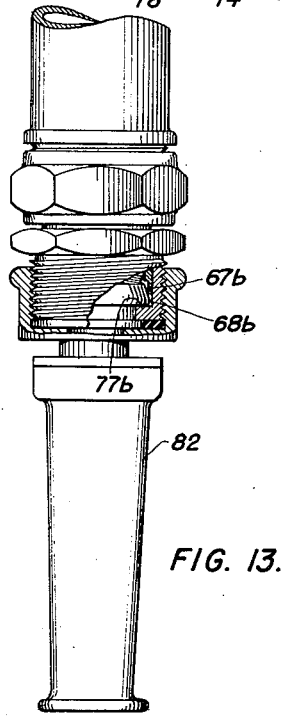
Figure 14:
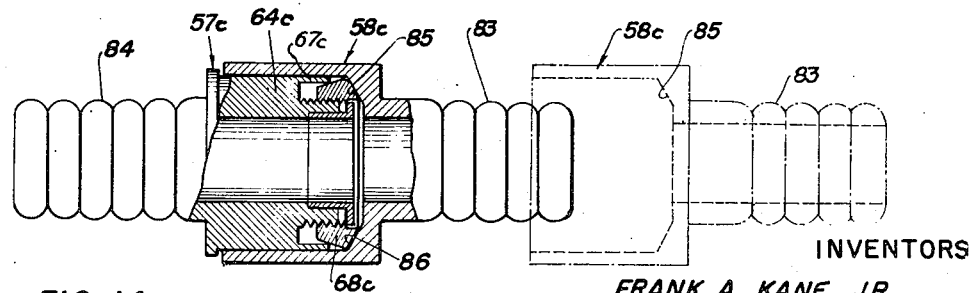

Figure 13 is a part elevational and part sectional view of a coupling device substantially in accordance with the construction of Fig. 12, shown coupling together a garden hose and a nozzle, and Figure 14 is a part elevational and a part sectional view of another modified form of my invention, showing a coupling securing together two sections of a garden hose, the dot-dash lines indicating the female portion in detached position.

In the embodiment of our invention illustrated in Figs. 1 to 6, the syringe member to which the invention is applied consists of an outer cylindrical shell 15 of conventional syringe structure containing therein the slidable plunger 16 embodying our invention (to be more specifically hereinafter described), said plunger having associated therewith a shaft 17 extending through end aperture 18 of the cylindrical shell 15 and terminating in the ring element 19 adapted to coact with ring members 20 and 21 when operatively manipulated in known manner.

The plunger 16 contains, in the preferred form illustrated, a cylindrical ring or spreading member 22 containing a relatively thin annular end wall 23, the outer surface 24 of said member 22, including outer surface 24a of portion 23, being adapted for slidable engagement with the inner wall 25 of cylindrical shell 15. The inner body portion 26 of the plunger contains the forcing member or spreader 27 and the shaft anchor member 28, members 27 and 28 being in telescopic slidable engagement, member 28 being the male member and 27 the female member. More specifically, forcing member 27 contains the cylindrical wall 29 and the central cavity 30, and member 28 contains enlarged portion 31 and the central boss 32 extending into cavity 30 and in slidable engagement with the inner surface of wall 29. The outer surface 33 of portion 31 and the outer surface 34 of wall 29 are both slidably engageable with the inner surface 35 of the spreading member 22. Member 28 contains the outer flange 36 in abutting engagement with the outer terminal 37 of spreading ring 22. Forcing member 27 contains the rear flanged portion 38 containing the lateral forwardly disposed tapered wall 39 which is adapted, as will more clearly hereinafter appear, to serve as a wedge for entering the annular space 40 between walls 23 and 29.

The shaft 17 contains the collar 41 which is in abutment with the rear surface 42 of flange 38, the shaft also containing a forwardly extending stud portion 43 in threaded engagement with the threaded aperture 44 within member 28, the aperture 45 in flange 38 being sufficiently large to serve as a clearing hole for said stud 43.

The member 22 is normally of a predetermined diameter adapted for sliding movement within cylindrical shell 15. Should it however be desired to increase the friction between the said member and the inner surface 25 of shell 15, or should it be necessary to increase the diameter of an operative portion of said member 22 because of wear, all that need be done is to rotate shaft 17 in the proper direction so as to draw members 27 and 28 together due to the threaded engagement of stud 43 and threaded aperture 44, the rear collar 41 forcing member 27 towards member 28, and the front collar 36 being in pressing engagement with terminal 37 of member 22. For best operative results, it is preferred to apply a slight lateral pressure towards a portion of the lateral wall of cylindrical shell 15, so that the member 22 will be frictionally held against rotation while member 17 is being adjustably rotated.

Upon the rotation of shaft 17 as aforesaid, and upon the consequent drawing together of the male and female members 27 and 28, the tapered edge 39 will operate somewhat in the manner of a wedge, forcing the thin annular wall 23 against the inner surface of shell 15. The amount of expansion of annular wall 23 and the frictional pressure it exerts against the embracing shell is obviously dependent upon the amount of adjusting turning of shaft 17. When the desired point is reached, as can be determined by a trial slidable manipulation of the plunger, the rotation is discontinued.

It is important to note that the material out of which member 22 is made should preferably be somewhat tempered, with a slight spring, so that upon a retracting rotation of shaft 17, its resiliency will cause it to return to its original position. It has been found, however, that since the actual amount of wear is small, being measurable in thousands of an inch, the amount of displacement of said shell 23 due to the wedging action of forcing member 27 is relatively slight, so that with practically any metal, such as brass or steel, there will be sufficient spring-back after said member 27 is retracted.

It is preferable to discontinue the use of member 22 when its annular portion 23 becomes too thin. Accordingly, the thickness of flanged portion 38, or the length of cylindrical wall 29, is so predetermined that annular wall 46 thereof engages the annular shoulder 47 of member 22 and/or wall 29a engages wall 31a, when wall 23 is reduced to a predetermined thickness. When there is abutment between said surfaces 46 and 47, or walls 29a and 31a, that will be a signal to the operator that the device is to be disassembled, and a new spreading member 22 substituted in place of the worn one.

In the modification shown in Figure 7, the forcing member 27a is substantially like the corresponding member 27 of the form above described; but the coacting member 48, while serving to receive the threaded portion of the stud 43a in the manner of portion 28, nevertheless serves a somewhat different purpose in that it contains a front flanged portion 49 corresponding in action to the rear flanged portion 38a, both flanged portions containing tapered walls 39a and 39b serving as oppositely disposed forcing or wedging members operable upon the opposite terminals of spreading member 22a. It will be noted that member 22a differs from the corresponding member 22 above described in that it has two annular end walls 23a and 23b, both operatively engaged by said tapered surfaces 39a and 39b, respectively. Thus, upon an operative rotation of shaft 17a in the manner aforesaid, members 27a and 48 will be drawn towards each other, to cause a spreading or expanding action of the thin walls 23a and 23b. It is accordingly obvious that in this modification the action is like that of the first form illustrated, except that the plunger 16a is expandable at both its terminal ends, rather than at one end as shown in the first form referred to.

In the modification shown in Figure 8, there are two forcing members 27b and 27c, both oppositely disposed and mounted over the stud 43b of shaft 17b, the threaded portion 50 of said stud being in threaded engagement with the recessed portion 51 of member 27c, the central aperture 52 of member 27b being proportioned to slidably receive therethrough the shank of said stud 43b.

Each of said forcing members 27b and 27c contains thereover a spreading member, the former coacting with the spreading member 22b, and the latter with the spreading member 22c. Each of said spreading members is provided with oppositely disposed thin annular terminal walls 53, substantially like the terminal walls 23a and 23b of Fig. 7. Also mounted over both of said forcing members 27b and 27c is the floating ring 54 having oppositely disposed tapered annular edges 55. These edges coact with the oppositely disposed tapered edges 56 of members 27b and 27c, to produce a spreading action of said walls 53 when the shaft 17d is rotatively manipulated. In other words, upon an operative rotation of said shaft 17b, both forcing members 27b and 27c are brought together, whereupon the thin annular walls 53 are urged outwardly due to the engaging action of tapered surfaces 55 and 56. This form of my invention is particularly adapted for plungers of relatively greater length than those shown in the forms above described; and although the drawing shows but two sets of spreading members 22b and 22c, it is obvious that any number of additional members can be added depending upon the length of the plunger or piston.

Figures 10, 11:
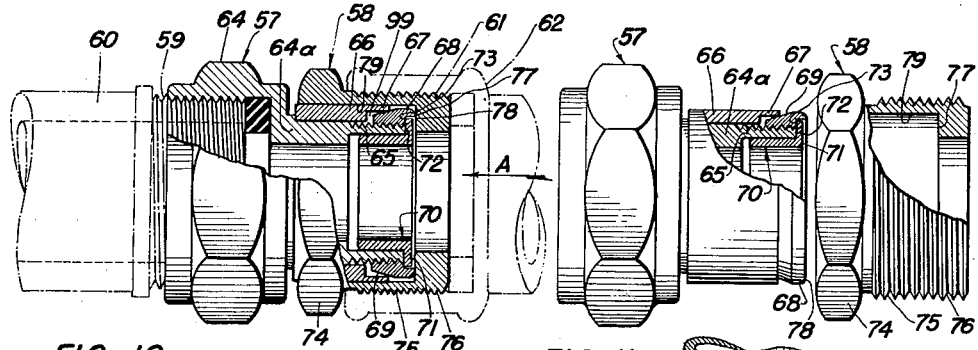
Figure 10 is a part elevational and part sectional view of two complementary pipe elements operatively secured together by the coupling form of my invention.
Figure 11 is a fragmentary disassembled view of the device of Fig. 10.

Figure 10 shows the application of my invention to a coupling device. In this construction, the coupling consists of a male portion 57 and a female portion 58, the male portion being adaptable to the threaded terminal 59 of hose 60, and the female member being adaptable to the threaded portion 61 of the female terminal fitting 62 of hose portion 63.

The male portion 57 of the coupling consists of a nut portion 64 internally threaded so as to engage said threaded portion 59, and having integrally therewith a cylindrical portion 64a, the terminal part 65 thereof being threaded. Mounted over the outer surface of said portion 64a is the spreading member 66, the terminal annular portion 67 being of reduced thickness, substantially in the manner of annular wall 23 of the first form above described. In threaded engagement with said portion 65 is the forcing or wedging member 68 containing a tapered surface 69 adapted to engage the said annular wall 67, and extending into the space 99 bounded by said wall 67. Holding said forcing member 68 against disengagement is the flanged gland 70 extending within member 64a, the flange 71 thereof abutting the annular terminal 72 of member 64a as well as the recessed shoulder 73 of forcing member 68.

The female portion 58 of the coupling consists of the nut portion 74 and the cylindrical portion 75 exteriorly threaded at 76 for threaded engagement with member 62. The said cylindrical portion has a hollow interior extending from the end portion 74 to the transverse wall 77, said wall being engageable with the outermost terminal 78 of said forcing member 68.

When the parts are in their assembled position as shown in Fig. 10, a rotary manipulation of member 62 will cause the entire female portion 58 to rotate therewith, because of the internal threaded arrangement; and if during such rotation a pressure is applied in the direction of the arrow A, surface 77 will frictionally bear against the annular terminal 78 of the forcing member 68, and will cause it to rotate around the threaded portion 65. Such rotation of forcing member 68 will cause it to move forwardly within recess 99, due to the thread at 65, whereby wall 69 will cause the thin annular wall 67 to spread outwardly and come into frictional engagement with the internal surface 79 of member 58. It has been found that a relatively small rotary movement in the manner above described will cause a firm locking engagement between the outer surface of annular wall 67 and the inner surface 79 of member 58. Similarly, an opposite rotation of member 62 will cause a release of the frictionally engaged parts, since the natural elasticity of wall 67 will cause it to return to its normal position. It is thus obvious that this device can effectively serve as a coupling for mutual engagement and disengagement of complementary parts of such members as tube, pipe sections and the like.

Figure 12 shows another adaptation of my invention, the male portion 59a being threaded over the outlet portion 80 of the faucet 81. The construction is substantially like that of Figures 10 and 11, the forcing member 68a being operatively engageable with the thin annular wall 67a of the spreading member 66a. Upon an operative rotation of the female terminal fitting 62a, the inner surface 77a will frictionally engage the adjacent surface 78a of the forcing or wedge member 68a, and effect a frictional locking of the two complementary members, in the manner aforesaid.

Similarly, in the nozzle coupling arrangement of Fig. 13, a rotation of nozzle 82 will cause the surface 77b to engage the forcing member 68b, and produce a frictional locking by spreading the thin annular wall 67b.

In Figure 14, the female portion 58c is integral with pipe section 83, and the male portion 57c is integral with pipe section 84. The elements are substantially the same as in the form of Fig. 10, except that the inner wall 85 of the female member 58c is inclined with respect to the longitudinal axis of the coupling; and the outer annular surface 86 of the forcing member 68c is correspondingly inclined. It has been found that this arrangement produces an effective frictional engagement between surfaces 85 and 86, so that upon an operative rotation of member 58c, the forcing ring 68c more readily rotates upon the thread of portion 64c of the male member 57c, and produces the spreading action of annular wall 67c in the manner aforesaid.

In the above description, the invention has been disclosed merely by way of example and in preferred manner; but obviously many variations and modifications may be made therein which will still be comprised within its spirit. It is to be understood, therefore, that the invention is not limited to any specific form or manner of practicing same, except insofar as such limitations are specified in the appended claims.

We claim:

1. In a device for adjustably interfitting two coactive members, the combination of an outer member and a coacting inner member; the outer member having an internal cylindrical wall; the inner member containing a relatively thick cylindrical portion having, at an end thereof, a relatively thin annular spreading wall encompassing an inner annular recess, the outer surfaces of said cylindrical portion and said spreading wall both being slidably engageable with said internal cylindrical wall, and a wedge member with an inclined operative wall extendable into said recess and engageable with the inner surface of said annular spreading wall, said wedge member being movable in the direction of the axis of the said cylindrical portion, whereby upon a movement of the wedge member into said recess the said operative wall will be brought into pressing engagement with said annular wall to cause a spreading thereof towards said internal cylindrical wall of the outer member, the relatively thick cylindrical portion retaining its original diameter.

2. In a device for adjustably interfitting two coactive members, the combination according to claim 1, the said annular spreading wall being of sufficient spring temper to permit it to return to substantially its original position upon an operative retraction of said wedge member in a direction away from said annular recess.

3. In a device for adjustably interfitting two coactive members, the combination according to claim 1, the said annular spreading wall being of spring temper.

4. In a device for adjustably interfitting two coactive members, the combination according to claim 1, said annular spreading wall being proportioned to permit it to be operatively spread into frictional engagement with said inner cylindrical wall.

5. In an adjustable plunger construction, the combination of an outer cylindrical shell, a coacting plunger therein, and a rod secured to the plunger and extending axially through said shell; said shell having an internal cylindrical wall; said plunger comprising a relatively thick cylindrical ring provided at an end thereof with a relatively thin annular spreading wall encompassing an inner annular recess, the outer surface of said ring and wall being slidably engageable with said internal cylindrical wall, and a wedge member with an inclined operative wall extendable into said recess and engageable with the inner surface of said spreading wall; said rod being engageable with said wedge member for moving it axially within said shell, whereby upon an operative movement of the wedge member into said recess said operative wall will be brought into pressing engagement with said annular wall to cause a spreading thereof towards said internal cylindrical wall, the relatively thick cylindrical ring retaining its original diameter.

6. In an adjustable plunger construction, the combination according to claim 5, the plunger being further provided with an anchor member; said rod having a collar engageable with said wedge member and a stud portion in threaded engagement with the anchor member, whereby upon a rotation of the rod the collar thereof will force the wedge member towards the anchor member and into said annular recess to cause an operative spreading action of said thin annular wall.

7. In an adjustable plunger construction, the combination according to claim 6, said wedge and anchor members being in telescopic slidable engagement.

8. In an adjustable plunger construction, the combination according to claim 7, said anchor member containing a flange in abutting engagement with the end of the said ring opposite said annular spreading wall.

9. In an adjustable plunger construction, the combination according to claim 8, said anchor member having a boss extending into the ring, the said wedge member having a hollow cylindrical portion extending into the opposite end of the ring, a portion of said boss extending into the said hollow cylindrical portion of the wedge member.

10. In an adjustable plunger construction, the combination according to claim 5, said plunger being provided with stop means engageable with the wedge member, whereby the operative movement of said wedge member into the recess will be limited by said stop means.

11. In an adjustable plunger construction, the combination according to claim 5, said thin annular wall forming an annular shoulder on the ring, said wedge member being engageable with said shoulder, to limit the operative movement of the wedge member into the recess.

12. In an adjustable plunger construction, the combination of an outer cylindrical shell, a coacting plunger therein, and a rod secured to the plunger and extending axially through said shell; said shell having an internal cylindrical wall; said plunger comprising a relatively thick cylindrical ring provided at its opposite ends with two relatively thin annular spreading walls each encompassing an annular recess, the outer surfaces of said ring and walls being slidably engageable with said internal cylindrical wall, and two oppositely disposed wedge members each with an inclined operative wall, said inclined walls being extendable into said recesses and engageable with the inner surfaces of said annular walls; said wedge members being operatively movable towards each other, whereby both of said operative walls will be brought into pressing engagement with the adjacent annular walls to cause a spreading thereof towards said internal cylindrical wall, the relatively thick cylindrical ring retaining its original diameter.

13. In an adjustable plunger construction, the combination of an outer cylindrical shell, a coacting plunger therein, and a rod secured to the plunger and extending axially through said shell; said shell having an internal cylindrical wall; said plunger comprising two axially aligned relatively thick cylindrical rings the opposite ends of each of which are provided with thin annular spreading walls, each encompassing an annular recess, the outer surfaces of said rings and walls being slidably engageable with said internal cylindrical wall, two oppositely disposed outer wedge members each with an inclined operative wall extendable into the adjacent recess and engageable with the inner surface of the adjacent annular wall, and a floating wedge ring disposed between said cylindrical rings and having oppositely disposed inclined operative walls each extendable into the adjacent inner recess and engageable with the inner surface of the adjacent inner annular wall, said outer wedge members being operatively movable towards each other, whereby both of their operative inclined walls will be brought into engagement with the adjacent annular walls to bring the two cylindrical rings into operative engagement with said floating wedge ring to cause a spreading of said annular walls towards said internal cylindrical wall, the relatively thick cylindrical rings retaining their original diameters.

14. In a coupling construction, the combination of a male member and a coacting female member; the female member having an internal cylindrical wall; the male member having a hollow cylindrical portion the outer terminal surface of which is threaded, a relatively thick cylindrical ring provided at an end thereof with a relatively thin annular spreading wall encompassing an inner annular recess, the outer surface of said ring and wall being slidably engageable with said internal cylindrical wall, and a cylindrical wedge member mounted over and in threaded engagement with said outer terminal surface, said wedge member having an outer inclined operative wall extendable into said recess and engageable with the inner surface of said spreading wall, whereby upon an operative rotation of the wedge member towards said ring, the said operative wall will be brought into pressing engagement with said annular wall to cause a spreading thereof towards said internal cylindrical wall, said annular wall being proportioned to permit it to be operatively spread into frictional engagement with said internal cylindrical wall, the relatively thick cylindrical ring retaining its original diameter.

15. In a coupling construction, the combination according to claim 14, further provided with a flanged gland extending into said hollow cylindrical portion of the male member, the flange of said gland being abuttable with said wedge member, whereby it will be held against detachment.

16. In a coupling construction, the combination according to claim 14, the female member being provided with a transverse wall frictionally engageable with the adjacent portion of the wedge member, whereby a rotation of the female member will cause the wedge member operatively to rotate over said threaded cylindrical position.

17. In a coupling construction, the combination according to claim 16, said transverse wall containing a peripheral inclined portion, said wedge member containing an adjacent inclined portion, both inclined portions being frictionally engageable.

18. In a device for adjustably interfitting two coactive members, the combination according to claim 5, further provided with an annular shoulder at the inner end of said spreading wall, said annular shoulder forming stop means for the operative movement of said wedge member, whereby said wedge member will engage said stop means when said annular spreading wall has been reduced to a predetermined thickness.

FRANK A. KANE, Jr.
GIRARD F. OBERRENDER.

REFERENCES CITED

The following references are of record in the file of this patent:

UNITED STATES PATENTS

| Number | Name | Date |
|---|---|---|
| 166,592 | Duvall | Aug. 10, 1875 |
| 1,468,458 | Deaking et al. | Sept. 18, 1923 |
| 1,790,390 | Reynolds | Jan. 27, 1931 |
| 1,955,157 | Wayne | Apr. 17, 1934 |
| 2,351,363 | Parker et al. | June 13, 1944 |
| 2,412,664 | Wolfram et al. | Dec. 17, 1946 |
| 2,452,890 | Wolfram | Nov. 2, 1948 |

FOREIGN PATENTS

| Number | Country | Date |
|---|---|---|
| 639,697 | Germany | of 1936 |
| 579,145 | Great Britain | of 1946 |